United States Patent
Wang et al.

(10) Patent No.: US 10,467,027 B1
(45) Date of Patent: Nov. 5, 2019

(54) DYNAMIC SCRIPT LOADING RESOURCE FILES

(71) Applicant: SAP SE, Walldorf (DE)

(72) Inventors: Nathan Wang, Port Coquitlam (CA); Rita Huang, Vancouver (CA); Pak Man Chan, Vancouver (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/112,470

(22) Filed: Aug. 24, 2018

(51) Int. Cl.
*G06F 9/44* (2018.01)
*G06F 9/445* (2018.01)
*G06F 8/41* (2018.01)

(52) U.S. Cl.
CPC ............ *G06F 9/44521* (2013.01); *G06F 8/41* (2013.01)

(58) Field of Classification Search
None
See application file for complete search history.

(56) References Cited

U.S. PATENT DOCUMENTS

2015/0046914 A1* 2/2015 Sahoo ................ G06F 9/44521
717/166

* cited by examiner

*Primary Examiner* — Qamrun Nahar
(74) *Attorney, Agent, or Firm* — Fountainhead Law Group P.C.

(57) ABSTRACT

The present disclosure provides a mobile App to provide a runtime environment on a mobile device. As part of start up processing, the mobile App can receive a resource bundle that contains an entry point application module and one or more resource modules. In some embodiments, the resource bundle contains no resource modules. The mobile App can load the entry point application module without loading the resource modules into the runtime environment, and start code execution. When a request for a resource module is encountered during code execution, the mobile App can access the requested resource module and load it into the runtime environment.

20 Claims, 6 Drawing Sheets

DYNAMIC SCRIPT LOADING RESOURCE FILES

BACKGROUND

Mobile applications for an enterprise can provide users in the enterprise with access to their data. For example, the SAP® Analytic Cloud™ (SAC™) Mobile app allows users to access their enterprise analytics on their mobile devices. This gives enterprise users access the most recent information about their business, no matter where they are working.

A convenient programming language for analytical applications is JavaScript because it allows for quick development and deployment of analytics to the user. A mobile device is typically configured with an application (mobile App) that provides a runtime environment to support the execution of JavaScript programs. JSContext is a commonly known environment for running JavaScript code. Webpack is a bundler that collects JavaScript files into a single resource bundle (usually), which can then be downloaded to the mobile device and loaded into JSContext by the mobile App. Since JSContext does not support browser functionality to load webpack resources from the network, the App is hardcoded to manually load the specific resource bundle(s) and its modules into JSContext.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
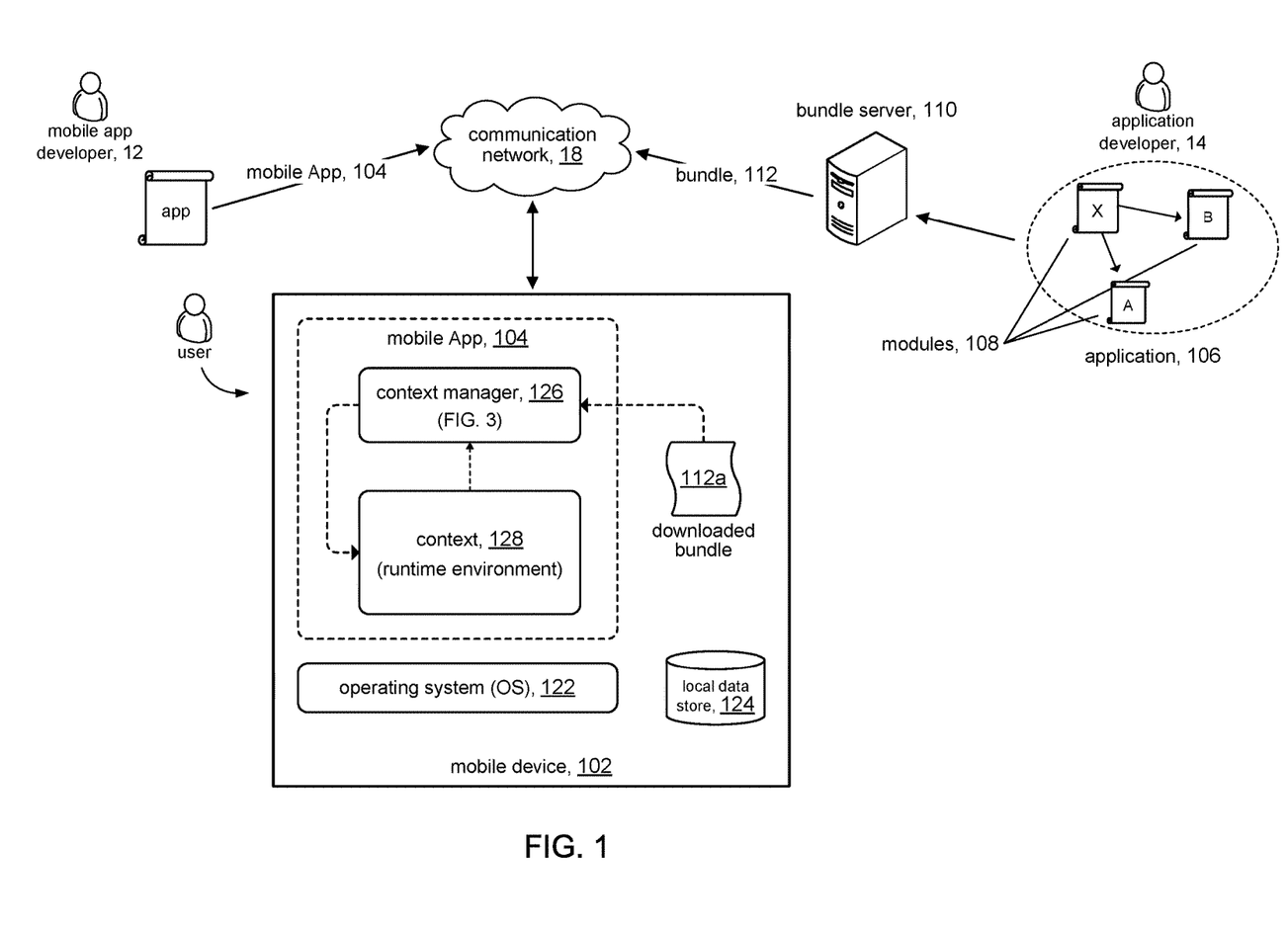
FIG. 1 is a high level diagram of a mobile device in accordance with the present disclosure.

FIG. 1 shows a mobile device 102 in accordance with embodiments of the present disclosure. The mobile device 102 can support the execution of a mobile App 104, which can serve as a platform for running applications such as application 106. In some embodiments, for example, application 106 can be a JavaScript application and mobile App 104 can provide a JavaScript runtime environment to support the execution of JavaScript files. Merely to illustrate an example, consider the SAP® Analytics Cloud (SAC) Mobile™ app. Applications that run on the SAC Mobile™ app can provide functionality such as data discovery, planning, predictive analysis capability, and the like for an enterprise. Applications can collect, analyze, simulate, plan, predict, and report on the enterprise data.

The mobile App 104 can be designed, written, and supported by a mobile app developer 12, or a team of developers. The mobile App 104 can be download or otherwise installed on the mobile device 102. For example, the mobile device 102 can initiate a download session over a communication network 18.

Likewise, application 106 can be designed, written, and supported by one or more application developer 14. An application 106 can comprise several modules 108. The example, in FIG. 1 shows that application 106 comprises modules X, A, B. Modules 108 can contain program code, data, or both. One module (e.g., X) can be designated the application module and the other modules can be designated as resource modules. In a JavaScript environment, for example, the modules can contain JavaScript code. Module X may contain the first JavaScript function (or entry point function) to be executed, and can be designated the entry point application module. The other modules A, B may contain functions that are invoked from the entry point function and/or data that is referenced by the entry point function. More generally, the modules A, B can contain functions/data that are subsequently accessed, directly or indirectly, from the entry point function. Although modules A, B can be referred to as application modules, they will be designated as resource modules to indicate their relation to the entry point module and to distinguish them from the entry point application module.

The modules 108 comprising an application 106 can be combined into a bundle of resources (resource bundle) 112. In some embodiments, for example, the modules 108 can be provided to a bundle server 110, which generates the resource bundle 112. For example, one such tool is the webpack bundler, which is a JavaScript module bundler that packages the modules 108 in an application 106 into one or more resource bundles.

The mobile device 102 can include a mobile operating system (OS) 122 and a local data store 124 to support the execution of mobile App 104.

The mobile App 104 can include a context manager 126 to set up and manage the context (runtime environment) 128 for an application 106 contained in a downloaded resource bundle 112a. In some embodiments, the context 128 can be a runtime environment that supports the execution of JavaScript code. In some embodiments, for example, the context 128 can be JSContext which is an object instance that defines the environment for running JavaScript code.

Figure 2:
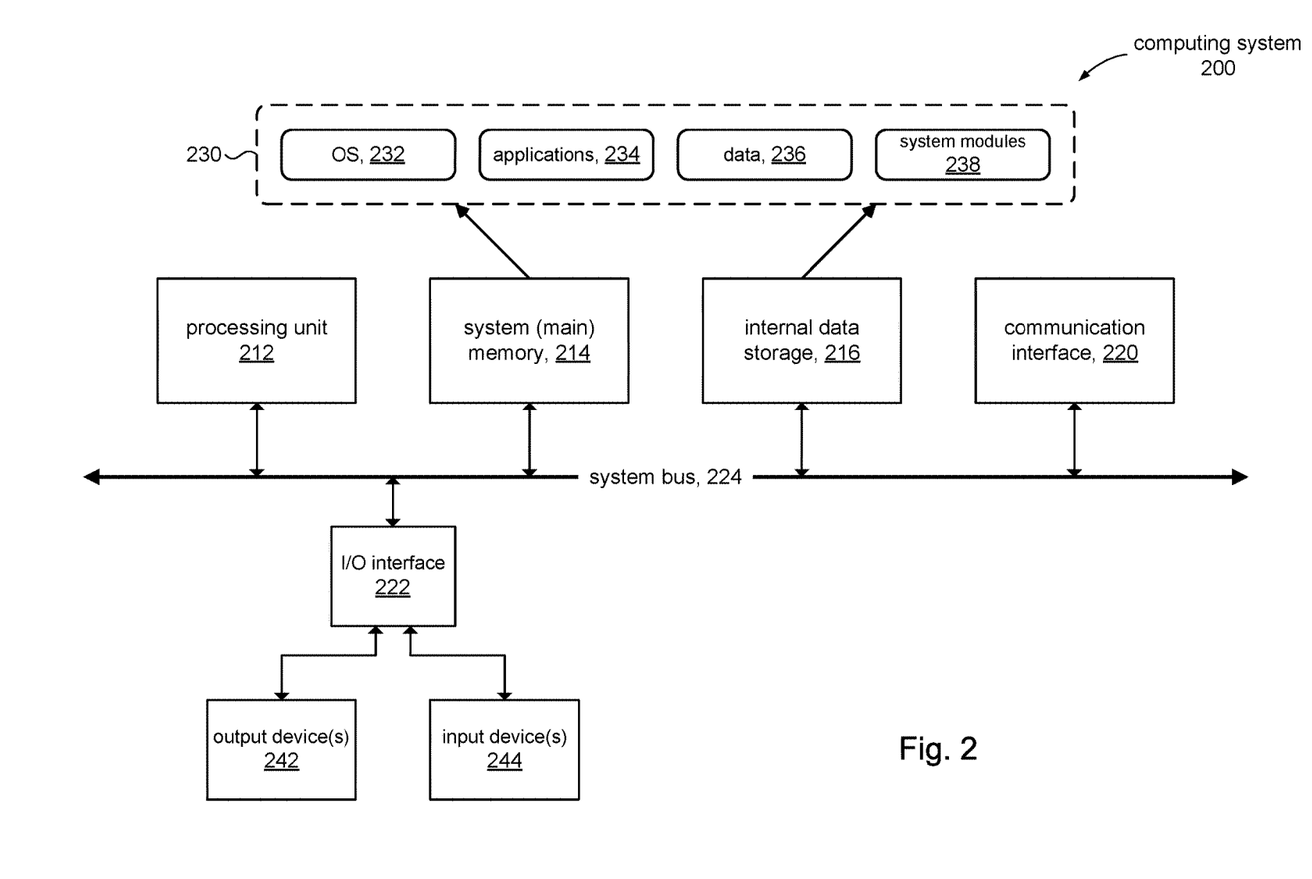
FIG. 2 is a schematic of a mobile device in accordance with some embodiments.

FIG. 2 is a simplified block diagram of an illustrative computing system 200 for implementing one or more of the embodiments described herein (e.g., mobile device 102, FIG. 1). The computing system 200 can perform and/or be a means for performing, either alone or in combination with other elements, operations in accordance with the present disclosure. Computing system 200 can also perform and/or be a means for performing any other steps, methods, or processes described herein.

Computing system 200 can include any single- or multi-processor computing device or system capable of executing computer-readable instructions. Examples of computing system 200 include, for example, mobile device 102 (FIG. 1) and other portable computing devices such as tablets, where power (battery), memory, and processing (CPU) resources are typically limited due to their small form factors. In a basic configuration, computing system 200 can include at least one processing unit 212 and a system (main) memory 214.

Processing unit 212 can comprise any type or form of processing unit capable of processing data or interpreting and executing instructions. The processing unit 212 can be a single processor configuration in some embodiments, and in other embodiments can be a multi-processor architecture comprising one or more computer processors. In some embodiments, processing unit 212 can receive instructions from program and data modules 230. These instructions can cause processing unit 212 to perform operations in accordance with the various disclosed embodiments (e.g., FIG. 3) of the present disclosure.

System memory 214 (sometimes referred to as main memory) can be any type or form of storage device or storage medium capable of storing data and/or other computer-readable instructions, and comprises volatile memory and/or non-volatile memory. Examples of system memory 214 include any suitable byte-addressable memory, for example, random access memory (RAM), read only memory (ROM), flash memory, or any other similar memory architecture. Although not required, in some embodiments computing system 200 can include both a volatile memory unit (e.g., system memory 214) and a non-volatile storage device (e.g., data storage 216, 246).

In some embodiments, computing system 200 can include one or more components or elements in addition to processing unit 212 and system memory 214. For example, as illustrated in FIG. 2, computing system 200 can include internal data storage 216, a communication interface 220, and an I/O interface 222 interconnected via a system bus 224. System bus 224 can include any type or form of signaling infrastructure to facilitate communication between one or more components comprising computing system 200.

Internal data storage 216 can comprise non-transitory computer-readable storage media to provide nonvolatile storage of data, data structures, computer-executable instructions, and so forth to operate computing system 200 in accordance with the present disclosure. For instance, the internal data storage 216 can store various program and data modules 230, including for example, operating system 232, one or more application programs 234, program data 236, and other program/system modules 238 to implement structures comprising buffer tree 106 and to support and perform various processing and operations disclosed herein.

Communication interface 220 can include any type or form of communication device or adapter capable of facilitating communication between computing system 200 and one or more additional devices (e.g., bundle server 110, FIG. 1). For example, in some embodiments communication interface 220 can facilitate communication between computing system 200 and a private or public network; e.g., communication network 18 (FIG. 1).

Computing system 200 can also include at least one output device 242 coupled to system bus 224 via I/O interface 222, for example, to provide access to a user. Computing system 200 can also include at least one input device 244 coupled to system bus 224 via I/O interface 222. In some embodiments, the output and input devices 242, 244 can be a touchscreen device.

Figure 3:
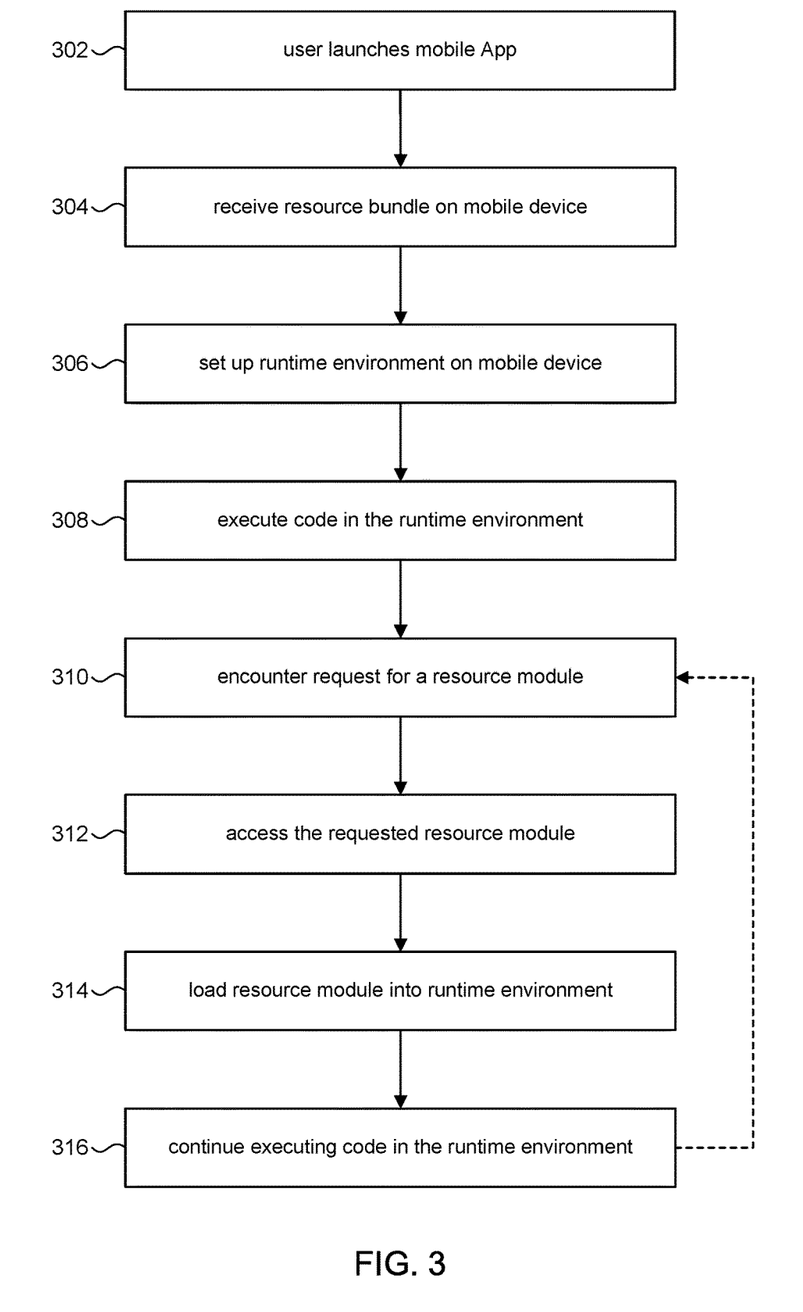
FIG. 3 is a process flow, showing operations for a context manager in accordance with the present disclosure.

Referring to FIG. 3 and other figures, the discussion will now turn to a high level description of operations and processing in the mobile device 102 (e.g., FIG. 1) in accordance with the present disclosure. In some embodiments, for example, the mobile App 104 can include computer executable program code, which when executed by a processor unit in mobile device 102 (e.g., 212, FIG. 2), can cause the mobile device 102 to perform processing in accordance with FIG. 3. The operations and processing described below are not necessarily executed in the order shown, and can be allocated for execution among one ore more concurrently executing processes and/or threads.

As explained above, in some embodiments the mobile device 102 can be configured for a JavaScript environment. Applications 106 can be JavaScript applications that execute in a JavaScript runtime environment 128 provide by the mobile App 104 executing on the mobile device 102. The SAC Mobile™ app, for example, executes JavaScript applications to support planning a decision making in an enterprise.

At operation 302, the mobile device 102 can start the mobile App in response to the user launching the mobile App, for example, by double-tapping on an icon displayed on a touchscreen display of the mobile device 102.

At operation 304, the mobile device 102 can receive a resource bundle 112 for an application to be executed in a runtime environment on the mobile App. In some embodiments, for example, the mobile device 102 can communicate with the bundle server 110 to download the specified resource bundle(s). In some embodiments, the resource bundle 112 can be hardcoded in the mobile App. In other words, the mobile app developer 12 can encode instructions in the mobile App to download a resource bundle 112; when the mobile App begins executing on the mobile device 102, the mobile App can download the encoded resource bundle 112. In other embodiments, the mobile App can be configured to interact with the user to identify a resource bundle 112 to download. For example, the mobile App can provide a suitable interface to allow a user to specify a resource bundle 112. For instance, the user may specify to download a forecasting application, which can then be mapped to a resource bundle 112. Alternatively, the user can explicitly identify a resource bundle 112; for example, the user may specify a resource bundle 112 by its full pathname (e.g., "/apps/marketing/forecast.js"). While the discussion assumes a single resource bundle 112, it will be understood that the processing can apply to more than one resource bundle 112.

At operation 306, the mobile device 102 can set up the runtime environment. In some embodiments, the context manager 126 in the mobile App can load modules 108 contained in the resource bundle 112 into the runtime environment. In a JavaScript environment, for example, the modules can be JavaScript files. The context manager 126 can load a module into the runtime environment on the mobile device 102 by:

compiling the JavaScript code that comprises the module
    loading the compiled module into the runtime environment
    inject the name of the compiled module into the namespace of the runtime environment In some embodiments, the resource bundle 112 may contain the entry point application module and several resource modules. In some embodiments, the context manager 126 can load all the modules contained in that resource bundle 112 in order to set up the runtime environment. In other embodiments, the context manager 126 can set up the runtime environment by loading only the entry point application module and not load any of the resource modules, which can reduce the time it takes to set up the runtime environment, thus improving the functioning on the mobile device 102 in terms of set up time. In still other embodiments, the context manager 126 can set up the runtime environment by loading the entry point application module and less than all of the resource modules, again to reduce the time for setting up the runtime environment.

In some embodiments, the resource bundle 112 may contain only the entry point application module and not include any resource modules that the entry point application module requires. In this case, the context manager 126 loads only the entry point application module. In this embodiment, the resource bundle 112 is much smaller since it contains only the entry point application module and thus the time it takes to download the resource bundle 112 can be significantly reduced, thus improving performance of the mobile device 102 in terms of starting up the mobile App.

At operation 308, the mobile device 102 can execute code in the runtime environment after the runtime environment is set up, and in particular the mobile device 102 can execute an entry point function. In a C program, the entry point function is "main( )". In a JavaScript environment, the JavaScript entry point function is the first function in the JavaScript file that is executed first; for example, the JavaScript entry point function may be the function that occurs first in the JavaScript file. Executing the entry point function initiates execution of the code runtime environment.

At operation, 310, the mobile device 102 can encounter a request for a resource module while executing code loaded in the runtime environment. The following fragment of JavaScript code shows an example of a such a request:

var start=Date.now( );
  function run ( ) {
    var b=require('./test/b.js');
    Console.log(b.helloWorld( ), Date.now( )-start)
  } where the require( ) function call requests a JavaScript file (the resource module) b.js at a file location given by the pathname "./test/b.js".

At operation 312, the mobile device 102 can access the requested (specified) resource module. The mobile device 102 can check the downloaded resource bundle 112 and access the specified resource module from the resource bundle 112. If the resource module is not in the resource bundle 112, the mobile device 102 can check its local date store 124 and access the resource module from the local data store. If the resource module is not in its local data store, the mobile device 102 can communicate with the bundle server 110 (or other server) to access the resource module from that server, for example, using the pathname of the resource module. In a particular implementation, this operation can be performed by a ImportScript( ) function provided in the context manager 126.

At operation 314, the mobile device 102 can load the access resource module into the runtime environment on the mobile device 102, as explained in operation 306. In a particular implementation, this operation can be performed by a ImportScript( ) function provided in the context manager 126. Recall from operation 306, in some embodiments, not all the resource modules contained in the resource bundle 112 may be loaded when setting up the runtime environment in order to reduce the time to set up the runtime environment. Nonetheless, a resource module can be loaded when it is needed, for example by way of a require( ) function call. This can improve the functioning of the mobile device 102 in that device resources (e.g., battery, processor, and memory capacity) can be consumed for resource modules on an as needed basis. This can be significant, since not all resource modules are necessarily needed. Consider, for example, the following pseudo-code fragment:

require (a)
  do something . . .
  if (condition), then require (b)
  else require (c)
  . . .

where resource module "b" will never need to be loaded if condition never evaluates to TRUE. Thus, consumption of mobile device resources can be reduced by loading resource modules only as needed which can improve performance of the mobile device 102 (e.g., extend battery charge, reduce memory usage, reduce processing load, etc.).

At operation 316, the mobile device 102 can continue executing code in the runtime environment, which can include code loaded in from a resource module. When mobile device 102 encounters another request for a resource module, processing can proceed to operation 310 to access and load in the additional resource module. Thus, requests for resource modules that are nested within other resource modules can be handled in the normal course of operating in accordance with FIG. 3.

Figure 4A:
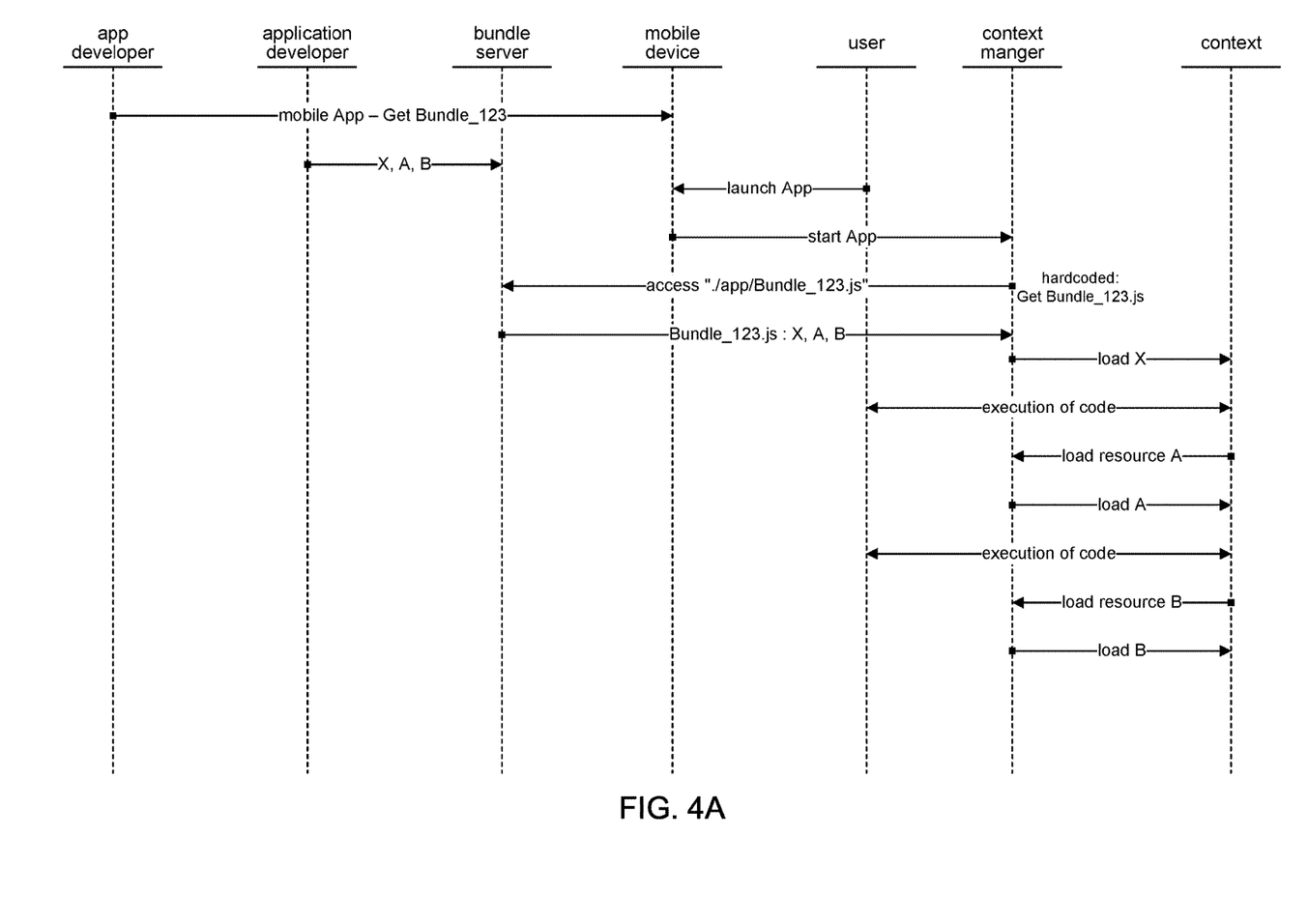
FIGS. 4A and 4B illustrate a workflow among the elements shown in FIG. 1.

Referring to FIG. 4A, the discussion will now turn to a description of an illustrative workflow between the elements shown in FIG. 1 with a mobile device 102 configured in accordance with the present disclosure.

The mobile app developer 12 develops their mobile App 104. The mobile App 104 can include a hardcoded statement to download a resource bundle 112 (e.g., "./app/Bundle_123.js"). At some point, the mobile App 104 can be downloaded to the mobile device 102. Likewise, an application developer 14 develops an application 106 for the mobile App 104. The application may comprise various modules X (entry point module) and A, B (resource modules). At some point, the application 106 can be uploaded to the bundle server 110 in preparation for subsequent downloading to the mobile device 102.

At some point, a user of the mobile device 102 can launch the mobile App 104. In response, the mobile device 102 can start execution of the mobile App 104. The context manager component 126 in the mobile App 104 can access the hardcoded reference to "Bundle_123.js," as part of the startup process of the mobile App 104, from the bundle server 110. In response to receiving Bundle_123.js, the context manager 126 can set up the context (runtime environment) 128 by loading only module X from the Bundle_123.js resource bundle, leaving the modules A, B not loaded. At this point, the context 128 is set up, and execution of code in the context 128 can begin.

During execution of the code, code and/or data contained in resource module A may be needed. In response, the context 128 can signal the context manager 126 to load resource module A. The context manager 126 can access the downloaded Bundle_123.js to extract resource module A and load it into the context 128, and execution of the code in the context 128 can resume. Later on, code and/or data contained in resource module B may be needed. In response, the context 128 can signal the context manager 126 to repeat the process to load resource module B. This workflow illustrates that resource modules can be dynamically loaded, on the fly, as needed.

Figure 4B:
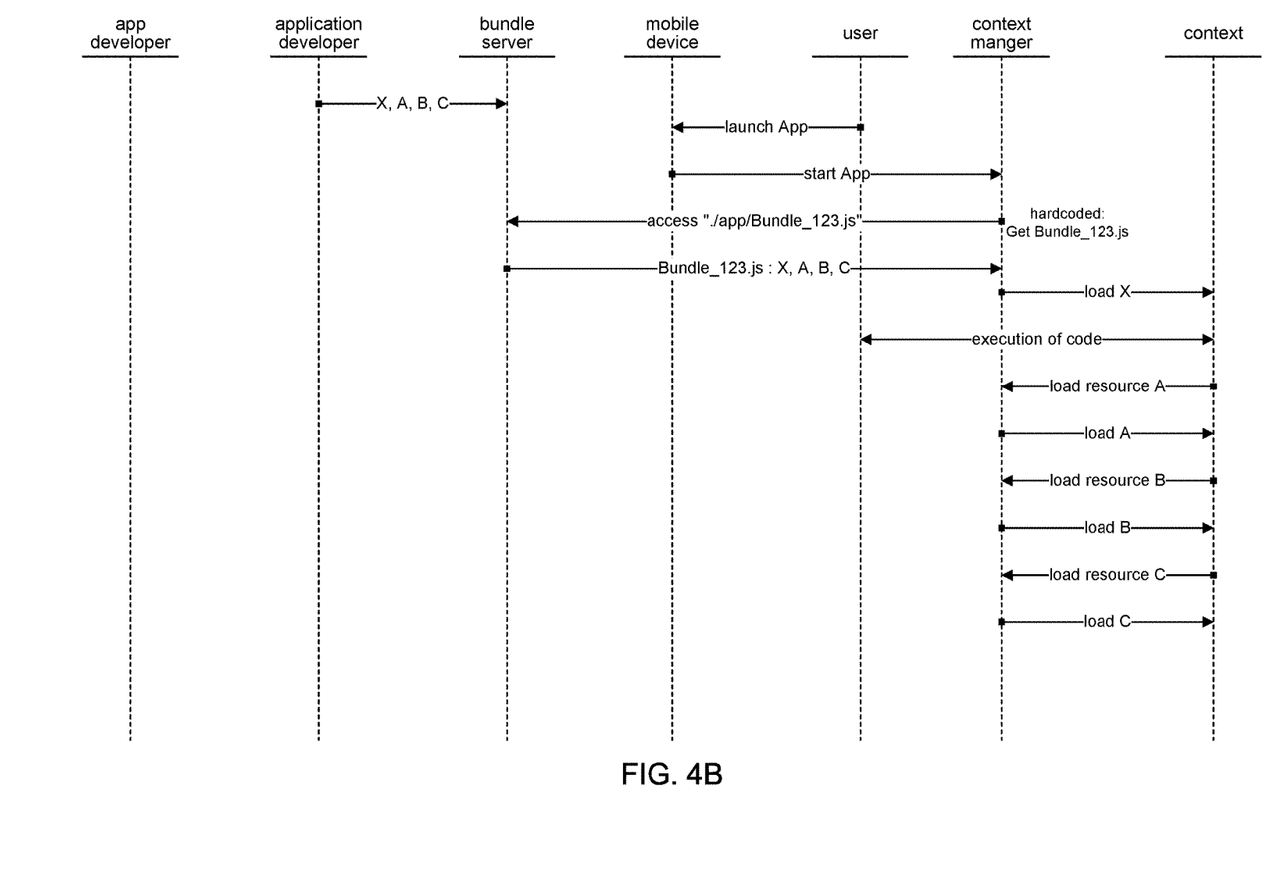

Referring to FIG. 4B, suppose now that the application developer 14 has modified or updated their application 106.

The update now requires resource module C. The modules 108 (X, A, B, C) comprising the application are uploaded to the bundle server 110. When the user launches the mobile App 104, this time the downloaded Bundle_123.js will contain modules X, A, B, C. When resource module C is needed during execution of the code, the context manager 126 can access the resource module from Bundle_123.js.

Notably, there is no need to update the mobile App 104, as compared to a conventional configuration of the mobile App, because the resource modules are loaded dynamically. To illustrate this difference, refer to FIG. 5 for a workflow between elements in a conventional mobile App.

Figure 5:
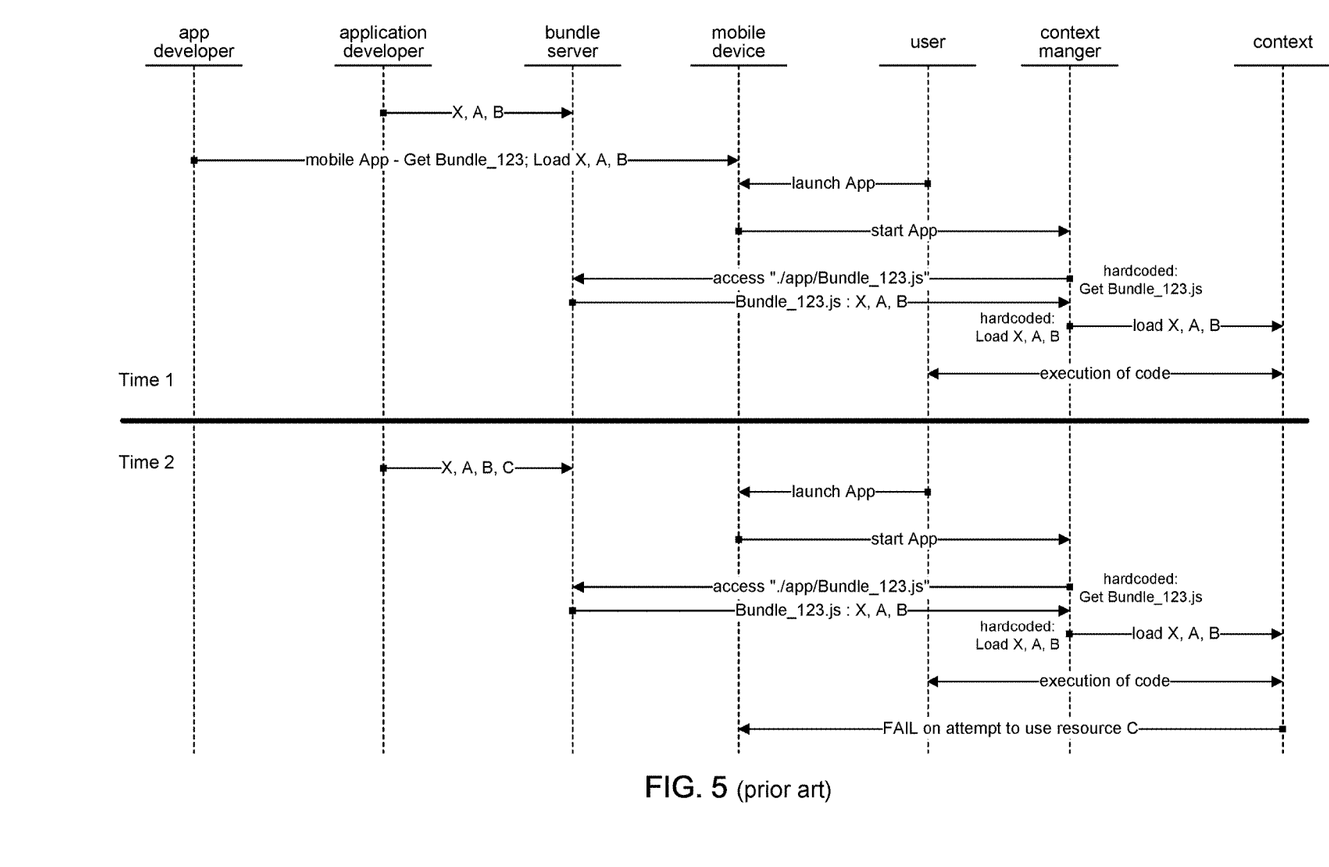
FIG. 5 illustrates a conventional workflow.

Consider the scenario at Time 1, where the application developer has written an application that consists of modules X, A, B. When the mobile App is coded, the mobile app developer includes lines of code in the mobile App to download the resource bundle 112 (e.g., "./app/Bundle_123.js") and to load in all the modules contained in the resource bundle 112. When the mobile App is launched, the context manager 126 will communicate with the bundle server to download the resource bundle 112 that is hard-coded by the mobile app developer, namely Bundle_123.js. The context manager 126 will then set up the context by loading modules X., A, and B into the context in accordance with the hardcoded load instructions. Execution of the code can then begin.

Suppose at Time 2, the application developer has made an update to their application. The updated application now consists of modules X, A, B, and C. When the user launches the mobile App, the context manager 126 will communicate with the bundle server to download Bundle_123.js. This time, however, Bundle_123.js contains modules X, A, B, and C. However, when the context manager 126 sets up the context, it will only load in modules X, A, and B per the hardcoded load instructions. Execution of the code can begin, but when that part of the code that uses resource module C is encountered, the code will fail because resource module C was never loaded.

CONCLUSION

The foregoing embodiments in accordance with the present disclosure improve functioning of the mobile device by conserving the typically limited resources of a mobile device such as battery power, processing capacity and main memory usage. In some embodiments, for example, at start up of the mobile App and after a resource bundle has been downloaded, only the entry point application module (and not the resource modules) is loaded into the runtime environment. This reduces the amount of processing (and hence battery consumption) in the mobile device to launch the mobile App. The code continues to function despite that the resource modules are not loaded at the time of setting up the runtime environment because those resource modules can be loaded as they are encountered during code execution. Memory usage is reduce because the runtime environment does not have to be initially loaded with every module in the received resource bundle, only the entry point application module. Memory for additional resource modules is consumed only as needed. In addition, by loading only the entry point application module, the time to launch the mobile App is reduced, thus giving the user access to the application that much quicker as compared to conventional processing where all the modules in the resource bundle are loaded into the runtime environment.

The foregoing embodiments in accordance with the present disclosure improve functioning of the mobile device by reducing battery consumption and memory usage in that, for some embodiments, the resource module can contain only the entry point application module. As such, the size of the resource bundle can be reduced by omitting the resource modules and containing only the entry point application module. As a result, the power consumed by the communication circuitry can be reduced because the smaller size of the resource bundle requires less communication time. Likewise, memory consumption can be reduced because the smaller size of the resource bundle requires less memory to be stored.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method on a mobile device comprising:
receiving a resource bundle comprising an application module and one or more resource modules (resources);
setting up a runtime environment on the mobile device, including loading the application module contained in the resource bundle into the runtime environment;
executing program code loaded in the runtime environment;
encountering a resource request while executing the program code, the resource request specifying a resource; and
in response to encountering the request for a resource while executing the program code, loading the specified resource into the runtime environment including:
accessing the specified resource from the resource bundle when the specified resource is contained in the resource bundle;
compiling the accessed resource;
loading the compiled resource into a memory of the mobile device; and
storing an identifier of the compiled resource into a namespace in the runtime environment of the mobile device;
wherein resources are loaded only in response to encountering resource requests for the resources.

2. The method of claim 1, wherein setting up the runtime environment does not include loading any resources contained in the resource bundle.

3. The method of claim 1, wherein loading the application module into the execution environment includes compiling the application module, loading the compiled application module into a memory of the mobile device, and storing an identifier of the compiled application module into a namespace on the mobile device.

4. The method of claim 1, wherein loading the specified resource further comprises accessing the specified resource from a local data store when the specified resource is not contained in the resource bundle and is stored on the local data store.

5. The method of claim 1, wherein loading the specified resource further comprises accessing the specified resource from a computer system separate from the mobile device when the specified resource is not contained in the resource bundle and is not stored on a local data store of the mobile device.

6. The method of claim 1, further comprising:
executing the compiled resource;
encountering a resource request for an additional resource while executing the compiled resource; and
in response to encountering the resource request for the additional resource, loading the additional resource into the runtime environment of the mobile device.

7. The method of claim 1, wherein the application modules are JavaScript files.

8. The method of claim 1, wherein the runtime environment is a JSContext instance.

9. A non-transitory computer-readable storage medium having stored thereon computer executable instructions, which when executed by a computer device, cause the computer device to:
receive a resource bundle comprising an application module and one or more resource modules (resources);
set up a runtime environment on the mobile device, including loading the application module contained in the resource bundle into the runtime environment;
execute program code loaded in the runtime environment;
encounter a resource request while executing the program code, the resource request specifying a resource; and
in response to encountering the request for a resource while executing the program code, load the specified resource into the runtime environment including:
accessing the specified resource from the resource bundle when the specified resource is contained in the resource bundle;
compiling the accessed resource;
loading the compiled resource into a memory of the mobile device; and
storing an identifier of the compiled resource into a namespace in the runtime environment of the mobile device;
wherein resources are loaded only in response to encountering resource requests for the resources.

10. The non-transitory computer-readable storage medium of claim 9, wherein setting up the runtime environment does not include loading any resources contained in the resource bundle.

11. The non-transitory computer-readable storage medium of claim 9, wherein the computer executable instructions, which when executed by the computer device, further cause the computer device to load the application module into the execution environment by:
compiling the application module;
loading the compiled application module into a memory of the mobile device; and
storing an identifier of the compiled application module into a namespace on the mobile device.

12. The non-transitory computer-readable storage medium of claim 9, wherein the computer executable instructions, which when executed by the computer device, further cause the computer device to load the specified resource by accessing the specified resource from a local data store when the specified resource is not contained in the resource bundle and is stored on the local data store.

13. The non-transitory computer-readable storage medium of claim 9, wherein the computer executable instructions, which when executed by the computer device, further cause the computer device to load the specified resource by accessing the specified resource from a computer system separate from the mobile device when the specified resource is not contained in the resource bundle and is not stored on a local data store of the mobile device.

14. The non-transitory computer-readable storage medium of claim 9, wherein the computer executable instructions, which when executed by the computer device, further cause the computer device to:
execute the compiled resource;
encounter a resource request for an additional resource while executing the compiled resource; and
in response to encountering the resource request for the additional resource, load the additional resource into the runtime environment of the mobile device.

15. An apparatus comprising:
one or more computer processors; and
a non-transitory computer-readable storage medium comprising instructions for controlling the one or more computer processors to be operable to:
receive a resource bundle comprising an application module and one or more resource modules (resources);
set up a runtime environment on the mobile device, including loading the application module contained in the resource bundle into the runtime environment;
execute program code loaded in the runtime environment;
encounter a resource request while executing the program code, the resource request specifying a resource; and
in response to encountering the request for a resource while executing the program code, load the specified resource into the runtime environment including:
accessing the specified resource from the resource bundle when the specified resource is contained in the resource bundle;
compiling the accessed resource;
loading the compiled resource into a memory of the mobile device; and
storing an identifier of the compiled resource into a namespace in the runtime environment of the mobile device;
wherein resources are loaded only in response to encountering resource requests for the resources.

16. The apparatus of claim 15, wherein setting up the runtime environment does not include loading any resources contained in the resource bundle.

17. The apparatus of claim 15, wherein the computer-readable storage medium further comprises instructions for controlling the one or more computer processors to be operable to load the application module into the execution environment by:
compiling the application module;
loading the compiled application module into a memory of the mobile device; and
storing an identifier of the compiled application module into a namespace on the mobile device.

18. The apparatus of claim 15, wherein the computer-readable storage medium further comprises instructions for controlling the one or more computer processors to be operable to load the specified resource by accessing the specified resource from a local data store when the specified resource is not contained in the resource bundle and is stored on the local data store.

19. The apparatus of claim 15, wherein the computer-readable storage medium further comprises instructions for controlling the one or more computer processors to be operable to load the specified resource by accessing the specified resource from a computer system separate from the mobile device when the specified resource is not contained in the resource bundle and is not stored on a local data store of the mobile device.

20. The apparatus of claim 15, wherein the computer-readable storage medium further comprises instructions for controlling the one or more computer processors to be operable to:
- execute the compiled resource;
- encounter a resource request for an additional resource while executing the compiled resource; and
- in response to encountering the resource request for the additional resource, load the additional resource into the runtime environment of the mobile device.

* * * * *